United States Patent
Kim et al.

(10) Patent No.: US 11,870,360 B2
(45) Date of Patent: Jan. 9, 2024

(54) BIDIRECTIONAL INSULATING DC-DC CONVERTER, CONTROL APPARATUS THEREFOR, AND OPERATING METHOD THEREOF

(71) Applicant: HYUNDAI MOBIS Co., Ltd., Seoul (KR)

(72) Inventors: Du Ho Kim, Yongin-si (KR); Deok Kwan Choi, Yongin-si (KR); Min Heo, Seongnam-si (KR); Kang Min Kim, Seoul (KR); Soo Min Jeon, Yongin-si (KR); A Ra Lee, Seongnam-si (KR); Won Gon Kim, Yongin-si (KR); Ji Hoon Park, Suwon-si (KR); Hyun Woo Shim, Suwon-si (KR); Tae Ho Bang, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 84 days.

(21) Appl. No.: 17/551,819

(22) Filed: Dec. 15, 2021

(65) Prior Publication Data
US 2022/0190734 A1 Jun. 16, 2022

(30) Foreign Application Priority Data
Dec. 15, 2020 (KR) .................. 10-2020-0175909

(51) Int. Cl.
*H02M 3/335* (2006.01)
*H02M 1/44* (2007.01)
(Continued)

(52) U.S. Cl.
CPC ......... *H02M 3/33584* (2013.01); *H02J 7/007* (2013.01); *H02M 1/0009* (2021.05);
(Continued)

(58) Field of Classification Search
CPC .................................................. H02M 3/33584
See application file for complete search history.

(56) References Cited

U.S. PATENT DOCUMENTS 10,763,739 B2 * 9/2020 Tanaka .................. H02M 1/088
11,329,570 B1 * 5/2022 Heo ...................... H02M 3/003
(Continued)

FOREIGN PATENT DOCUMENTS

DE 102019005121 A1 * 4/2020
DE 102020135085 A1 * 6/2022 .......... H02M 3/1582
(Continued)

*Primary Examiner* — Sisay G Tiku
(74) *Attorney, Agent, or Firm* — Morgan, Lewis & Bockius LLP

(57) ABSTRACT

The bidirectional insulating DC-DC converter shares high/low voltage terminals, a cooling passage, a housing, and a control board, and two independent step-down circuit (10) and step-up circuit (20) are formed in parallel to perform a bidirectional DC power conversion. A high voltage applied from a high voltage battery HV is stepped down through the step-down circuit (10) and output to a low voltage battery LV. On the other hand, a low voltage applied from the low voltage battery LV is stepped up through the step-up circuit (20) and output to the high voltage battery HV. The step-down circuit (10) is formed as an active clamp forward converter circuit, and the step-up circuit (20) is formed as an active clamp flyback converter circuit.

15 Claims, 8 Drawing Sheets

(51) Int. Cl.
    *H02M 1/00*      (2006.01)
    *H02J 7/00*      (2006.01)
    *B60L 53/20*     (2019.01)
(52) U.S. Cl.
    CPC .......... *B60L 53/20* (2019.02); *B60L 2210/10* (2013.01); *H02J 2207/20* (2020.01); *H02M 1/44* (2013.01)

(56) References Cited

U.S. PATENT DOCUMENTS

| | | | | |
|---|---|---|---|---|
| 11,431,253 | B2 * | 8/2022 | Kim | H02M 3/33584 |
| 2008/0304292 | A1 * | 12/2008 | Zeng | H02M 3/33584 |
| | | | | 363/21.01 |
| 2009/0072625 | A1 * | 3/2009 | Oga | H02M 1/10 |
| | | | | 307/80 |
| 2010/0133912 | A1 * | 6/2010 | King | H02M 3/1582 |
| | | | | 307/82 |
| 2010/0136379 | A1 * | 6/2010 | King | B60L 58/40 |
| | | | | 429/432 |
| 2012/0181990 | A1 * | 7/2012 | Asakura | H02J 5/00 |
| | | | | 320/137 |
| 2013/0015821 | A1 * | 1/2013 | Kim | H02J 7/0019 |
| | | | | 320/128 |
| 2015/0015181 | A1 * | 1/2015 | Kondo | H02M 3/33584 |
| | | | | 320/103 |
| 2015/0210171 | A1 * | 7/2015 | King | B60L 50/40 |
| | | | | 29/825 |
| 2015/0280579 | A1 * | 10/2015 | Ishigaki | B60L 3/04 |
| | | | | 307/77 |
| 2017/0012536 | A1 * | 1/2017 | Lin | H02M 3/33584 |
| 2017/0358987 | A1 * | 12/2017 | Oouchi | H02M 3/3353 |
| 2018/0175736 | A1 * | 6/2018 | Ishigaki | H02M 3/005 |
| 2018/0241313 | A1 * | 8/2018 | Goto | H02J 7/34 |
| 2019/0222139 | A1 * | 7/2019 | Elsayad | H02M 7/49 |
| 2019/0348833 | A1 * | 11/2019 | Sun | H02H 9/002 |
| 2020/0014306 | A1 * | 1/2020 | Riar | H02M 3/285 |
| 2020/0212817 | A1 * | 7/2020 | Sun | H02M 1/083 |
| 2021/0155100 | A1 * | 5/2021 | Khaligh | H02M 1/4208 |
| 2022/0166332 | A1 * | 5/2022 | Shim | H02M 3/33584 |
| 2022/0200454 | A1 * | 6/2022 | Kim | H02M 3/33584 |

FOREIGN PATENT DOCUMENTS

| | | | | | |
|---|---|---|---|---|---|
| JP | 6774519 | B2 | * | 10/2020 | .......... B60L 11/1803 |
| KR | 20160049334 | A | * | 5/2016 | |
| KR | 20170049177 | A | * | 5/2017 | |
| KR | 101850467 | B1 | * | 4/2018 | |
| KR | 102001078 | B1 | * | 7/2019 | |
| KR | 102001079 | B1 | * | 7/2019 | |
| WO | WO-2023278972 | A1 | * | 1/2023 | |

* cited by examiner

Q_HSMN :  ----------
Q_HSCL :  ▬▬▬▬▬▬

PRIMARY STAGE OF TRANSFORMER : ----------

SECONDARY STAGE OF TRANSFORMER : ----------
TERTIARY STAGE OF TRANSFORMER : ▬▬▬▬▬▬

OUTPUT VOLTAGE : ─────

OUTPUT CURRENT : ─────

Q_LSMN : ─────
Q_LSCL : ━━━━━

PRIMARY STAGE OF TRANSFORMER : ─────

SECONDARY STAGE OF TRANSFORMER : ———

OUTPUT VOLTAGE : ———

OUTPUT CURRENT : ———

BIDIRECTIONAL INSULATING DC-DC CONVERTER, CONTROL APPARATUS THEREFOR, AND OPERATING METHOD THEREOF

CROSS-REFERENCE TO RELATED APPLICATION

This application claims the benefit of priority to Korean Patent Application No. 10-2020-0175909, filed on Dec. 15, 2020 in the Korean Intellectual Property Office, the entire disclosure of which is incorporated herein by reference for all purposes.

BACKGROUND

1. Technical Field

The present disclosure relates to a bidirectional insulating DC-DC converter, and more particularly, to a bidirectional insulating DC-DC converter separately including a step-down circuit and a step-up circuit, a control apparatus therefor, and operating method thereof.

2. Discussion of Related Art

Low voltage DC-DC converters (LDC), which are DC power supplies applied to eco-friendly vehicles (hybrid electric vehicles (HEV), plug-in hybrid electric vehicles (PHEV), EV, and fuel cell vehicles (FCV)) by replacing an alternator of an internal combustion engine, are essential devices which receive high voltage battery power (for example, in a range of 180 V to 450 V) to charge low voltage batteries (for example, 12 V) or supply power required for electrical and electronic parts in a vehicle. The LDC is used to reduce a load of an engine to increase fuel efficiency and handling increased electrical and electronic loads.

In a typical LDC, a high voltage part should be insulated from a low voltage part for the safety of a driver and a repairer, and power is transmitted in one direction, and output power is about 1.8 kW. In addition, a bidirectional blocking metal oxide semiconductor field effect transistor (MOSFET) is provided to prevent a reverse current phenomenon or an accident and block a current.

A phase shifted full bridge converter is mostly used as a power circuit used in the conventional LDC and is technically stabilized. Recently, an active clamp forward converter is established as a new technique.

As described above, the LDC currently being mass-produced is an isolated, unidirectional, and 1.8 kW product, but the market demands a larger capacity and a bidirectional power transfer function. A bidirectional, that is, integrated step-up/step-down DC, converter is an essential element for eco-friendly vehicles capable of driving autonomously and aims to secure stability of an autonomous driving system by determining stability of the low voltage battery (e.g., 12 V) and, simultaneously, to stably supply power to electrical and electronic loads of the vehicle.

Such a demand of the market is to respond to autonomous driving and vehicle function safety. The basis of vehicle safety is a 12 V battery, and a safety status may be checked by discharging the 12 V battery at a large current at every vehicle start. In addition, in order to meet the market demand for bidirectional power transfer, in addition to the above-described LDC, a separate step-up DC converter is required. The separate step-up DC converter should be insulated. In this case, there is a disadvantage in that a size of a product should be increased and a material cost also becomes expensive.

SUMMARY

The present disclosure is directed to solving the above problems, and a bidirectional insulating DC-DC converter sharing high/low voltage terminals, a cooling passage, a housing, and a microcomputer (a control board) and having an output that is greater than an output of the existing product, a control device therefor, and an operating method thereof are provided.

To solve the problems, the bidirectional insulating DC-DC converter shares high/low voltage terminals, a cooling passage, a housing, and a control circuit (a control board), and two independent step-down circuit and step-up circuit are formed in parallel to perform a bidirectional DC power conversion. The step-down circuit may be formed as an active clamp forward converter circuit, and the step-up circuit may be formed as an active clamp flyback converter circuit. A forward converter may be generally more efficient at a light load with a low output and may be consistent with a profile of a use amount of a main load in the vehicle and suitable for reducing power conversion loss.

In addition, in the step-down circuit of the present disclosure, a rectifying diode in low voltage stage used in the existing forward converter may be replaced with a large current type semiconductor switch element, such as a metal oxide semiconductor field effect transistor (MOSFET), to decrease a reduction in efficiency even in a situation in which an output current is large. Accordingly, high efficiency, which is an important factor in an eco-friendly vehicle, may be satisfied.

In addition, one control board controls the step-down circuit and the step-up circuit, the ease of control is high, and a signal can be used in common when a logic is formed, and thus costs of components and a probability of malfunction may be reduced.

A configuration and an operation of the present disclosure will become more apparent from embodiments described in detail below with reference to the drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present disclosure and methods for achieving them will be made clear from exemplary embodiments described in detail below with reference to the accompanying drawings. However, the present disclosure is not limited to the embodiments described below and may be implemented in various other forms. The embodiments are provided such that this disclosure will be thorough and complete and will fully convey the scope of the present disclosure to those skilled in the art to which the present disclosure pertains, and the present disclosure is defined only by the scope of the appended claims. In addition, terms used herein are for the purpose of describing the embodiments and are not intended to limit the present disclosure. In this disclosure, the singular forms include the plural forms unless the context clearly dictates otherwise. The term "comprise" or "comprising" used herein does not preclude the presence or addition of one or more other elements, steps, operations, and/or devices other than stated elements, steps, operations, and/or devices. Hereinafter, exemplary embodiments of the present disclosure will be described in detail with reference to the accompanying drawings. In describing the embodiments, if a detailed description of related known configurations or functions is determined to obscure the gist of the present disclosure, the detailed description thereof will be omitted.

Figure 1:
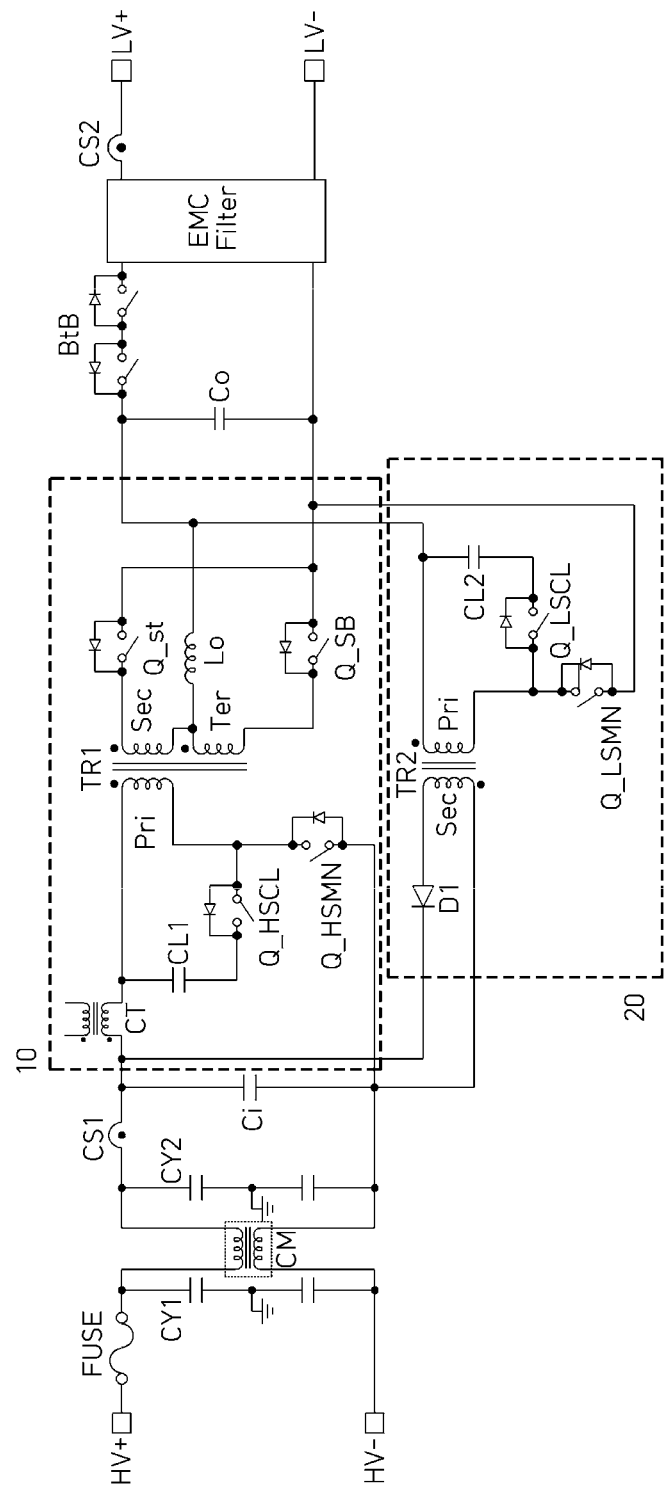
FIG. 1 is an exemplary diagram illustrating a circuit of a bidirectional insulating low voltage DC-DC converter (LDC) according to one embodiment of the present disclosure.

FIG. 1 is an exemplary diagram illustrating a circuit of a bidirectional insulating low voltage DC-DC converter (LDC) according to one embodiment of the present disclosure;

First, an overall circuit configuration will be described. A high voltage applied from a high voltage battery HV for a vehicle shown on a left side is stepped down through a step-down circuit 10 and output to a low voltage (e.g., 12 V) battery LV shown on a right side. On the other hand, a low voltage applied from the low voltage battery LV is stepped up through a step-up circuit 20 and output to the high voltage battery HV. In the bidirectional insulating direct DC-DC converter of the present embodiment, two independent circuits (the step-down circuit 10 and the step-up circuit 20) are formed in parallel. The step-down circuit 10 is an active clamp forward converter circuit (hereinafter referred to as a forward converter circuit), and the step-up circuit 20 is an active clamp flyback converter circuit (hereinafter referred to as a flyback converter circuit).

In addition to these separate circuits, a filter and a printed circuit board (PCB) in high and low voltage stages are used in common so that costs and a space may be reduced. Main circuit components used in common are described as follows.

1) HV: a high voltage battery for a vehicle (e.g., 180 V to 450 V).
2) LV: a low voltage battery for a vehicle (e.g., 12 V).
3) CY1 and CY2: a Y-CAP in a high voltage stage (a capacitor for noise filtering connected between a power line and a ground).
4) CM: a CM filter in the high voltage stage (an inductor).
5) Ci: a DC filter in the high voltage stage (a capacitor).
6) Co: a DC filter in a low voltage stage (a capacitor).
7) Cs1: a current sensor in the high voltage stage (using a Hall sensor).
8) Cs2: a current sensor in the low voltage stage (using a Hall sensor).
9) BtB: a bidirectional back-to-back semiconductor switch device for separating the low voltage stage.
10) EMC Filter: a filter for blocking an electromagnetic wave in the low voltage stage through which a large current flows.

Hereinafter, the step-down circuit 10 will be described in detail. Here, as described above, the step-down circuit 10 is formed as a forward converter circuit.

First, main components of the step-down circuit 10 will be described

1) CT: a current transformer for detecting a current value by converting the current value into a voltage for current control of the high voltage stage which is an input part of the step-down circuit 10.
2) CL1: a capacitor for limiting a transformer voltage (a clamp capacitor).
3) Q_HSMN and Q_HSCL: semiconductor switch elements in the high voltage stage.
4) TR1: an insulating transformer having one input (a primary side) in the high voltage stage and two outputs (a secondary side and a tertiary side) in the low voltage stage.
5) Q_ST and Q_SB: large current type semiconductor switch elements in the low voltage stage.
6) Lo: an inductor for filtering an output current.

The operation principle of the step-down circuit 10 is as follows.

The forward converter which uses the HV as an input and the LV as an output alternately switches the semiconductor switch elements Q_HSCL and Q_HSMN in the high voltage stage and transfers electrical energy of the HV to the LV. Since a difference in voltage between the HV and the LV is significantly large, there is a limitation in obtaining a desired output voltage by adjusting a duty (=a time during which a switch is turned on) as in a general DC-DC converter. The transformer TR1 is a necessary element to overcome the large difference in input/output voltage and to electrically insulate. In consideration of the HV-LV voltage difference and a duty variable limit, a ratio between a primary winding, a secondary winding, and a tertiary winding is determined in the transformer TR1. When the semiconductor switch elements Q_HSMN and Q_HSCL in the high voltage stage operate, square waves in the form of an alternate current (AC) are output at secondary/tertiary stages of the transformer TR1. The large current type semiconductor switch elements Q_ST and Q_SB in the low voltage stage rectify the square waves. The semiconductor switch elements Q_ST and Q_SB in the low voltage stage are used to decrease a reduction in efficiency even when an output current is large by replacing the existing rectifier diode used in the forward converter with a semiconductor element such as a MOSFET. Accordingly, high efficiency, which is an important factor in an eco-friendly vehicle, may be satisfied. The rectified output voltage is then maintained as a constant stable output voltage due to a filtering action of the output inductor Lo and the output capacitor Co.

FIGS. 2A-2E show diagrams illustrating waveforms of the main components during an operation of the step-down circuit 10.

Figure 2A:
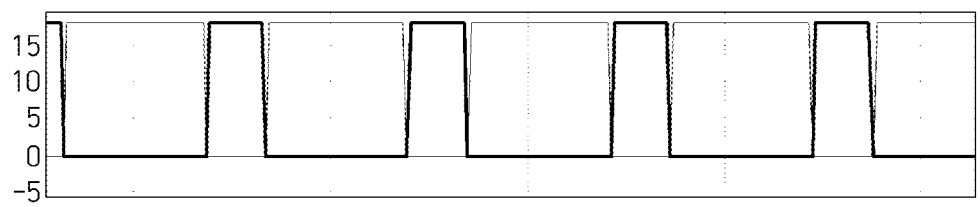
FIGS. 2A-2E show diagrams illustrating waveforms of main components during an operation of a step-down circuit (10)
Figure 2B:
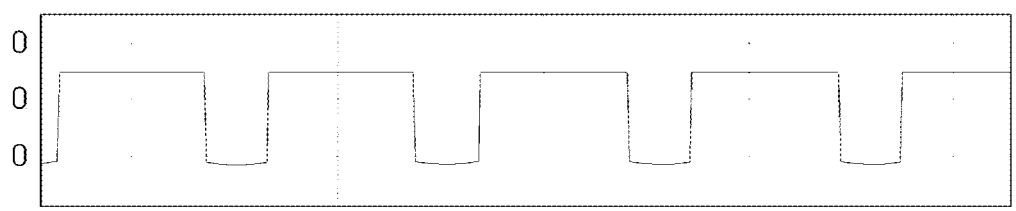

In FIG. 2A, the semiconductor switch elements Q_HSMN and Q_HSCL in the high voltage stage are alternately turned on and off so as to not overlap each other. In FIG. 2B, due to the alternate turning on/off operation, a square wave in the form of an AC is applied to the primary state (the high voltage stage) of the transformer TR1, and this voltage is an HV voltage at a (+) terminal and is a voltage of the clamp capacitor CL1 at a (−) terminal. The clamp capacitor CL1 prevents the transformer TR1 from being saturated and, simultaneously, transfers electrical energy to the low voltage stage. This is a characteristic of the active clamp forward converter different from the general forward converter which transfers energy only when the Q_HSMN is turned on. Consequently, the transformer may be efficiently used and a size of the transformer may be reduced.

Figure 2C:
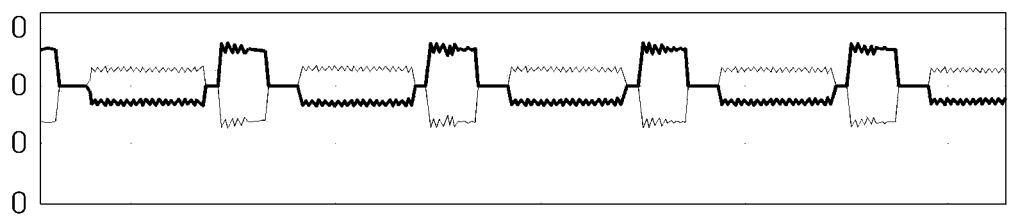

In FIG. 2C, in the low voltage stage (the secondary windings and the tertiary winding) of the transformer TR1, the voltage of the primary stage is decreased due to a transformer winding turn ratio, and an output voltage is consistently maintained through the output inductor Lo and the output capacitor Co.

Figure 2D:
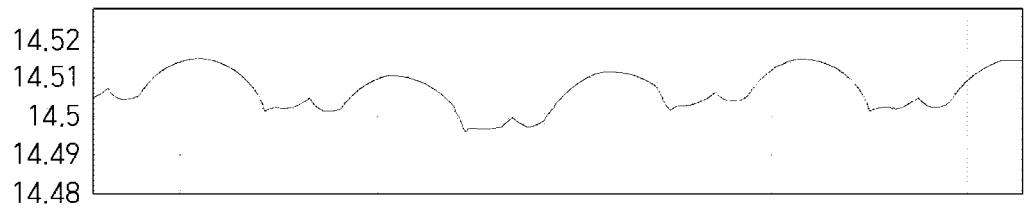

In FIG. 2D it can be seen that a target output voltage is 14.5 V and a ripple of the output voltage is maintained at about 20 mV.

Figure 2E:
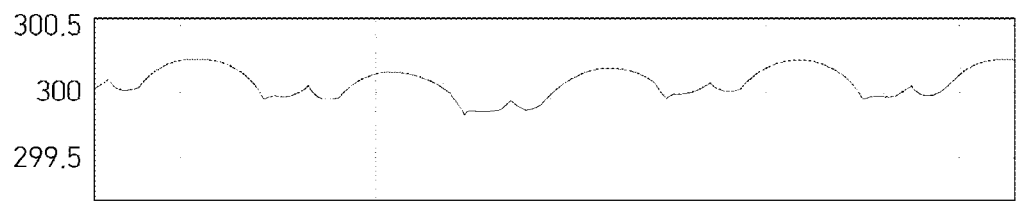

In FIG. 2E it can be seen that a target value of the output current is 300 A and the ripple is maintained at about 0.2 A.

Next, the step-up circuit 20 of FIG. 1 will be described in detail. Here, as described above, the step-up circuit 20 is formed as a flyback converter circuit.

First, main components of the step-up circuit 20 will be described.

1) CL2: a capacitor for limiting a transformer voltage (a clamp capacitor).
2) Q_LSMN and Q_LSCL: semiconductor switch elements in the low voltage stage.
3) TR2: a transformer having one input (primary) and one output (secondary).
4) D1: a rectifying diode in an output stage.

The operation principle of the step-up circuit 20 is as follows.

The flyback converter which uses the LV as an input and the HV as an output alternately switches the semiconductor switch elements Q_LSCL and Q_LSMN in the low voltage stage and transfers electrical energy of the LV to the HV. Since a difference in voltage between the LV and the HV is significantly large, the transformer TR2 is required as in the step-down circuit 10, and a winding ratio of the transformer TR2 should be designed in advance. When the semiconductor switch elements Q_LSCL and Q_LSMN in the low voltage stage operate, a square wave in the form of an AC is output from the secondary winding of the transformer TR2, and a diode D1, which is a rectifying element connected between the low voltage stage and the high voltage stage, rectifies the square wave. Thereafter, an output capacitor Ci filters the output voltage to maintain a constant and stable output voltage.

FIGS. 3A-3E show diagrams illustrating waveforms of the main components during an operation of the step-up circuit 20.

Figure 3A:
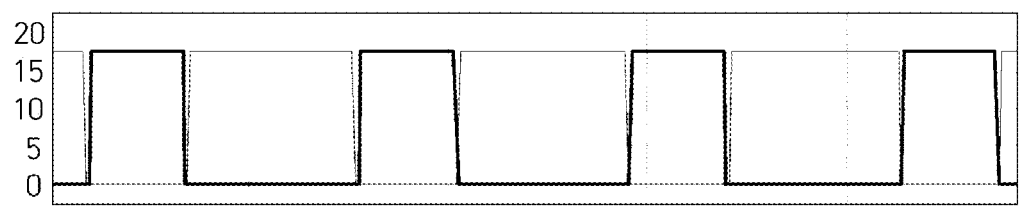
FIGS. 3A-3E show diagrams illustrating waveforms of main components during an operation of a step-up circuit (20)

In FIG. 3A, the semiconductor switch elements Q_LSCL and Q_LSMN in the low voltage stage are alternately turned on and off so as to not overlap each other.

Figure 3B:
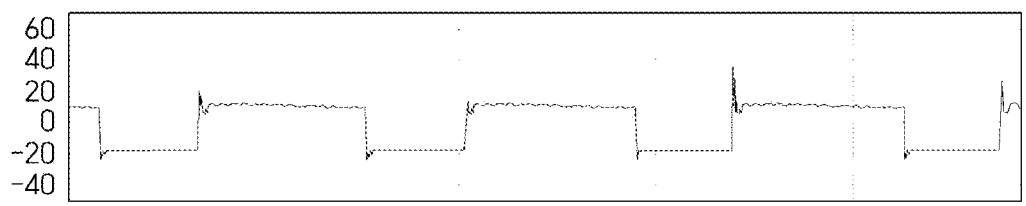

In FIG. 3B, due to the alternate turning on/off operation, a square wave in the form of an AC is applied to the primary stage (the low voltage stage) of the transformer TR2, and this voltage is an LV voltage at a (+) terminal and is a voltage of the clamp capacitor CL2 at a (−) terminal. The clamp capacitor CL2 prevents the transformer TR2 from being saturated so that the transformer TR2 may be efficiently used, and thus a size of the transformer TR2 may be reduced.

Figure 3C:
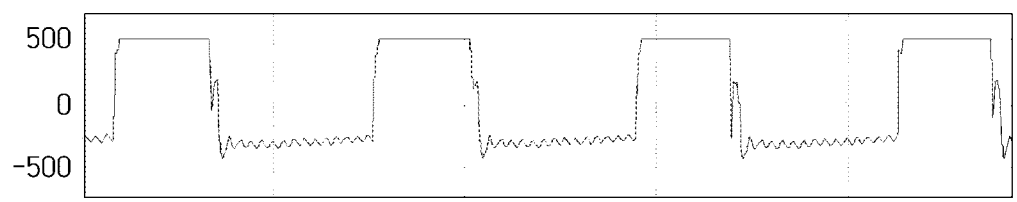

In FIG. 3C, in the high voltage stage (=the secondary stage) of transformer TR2, the voltage of the primary stage is increased due to a transformer winding turn ratio, and the voltage rectified by the output diode D1 maintains a stable output voltage through the output capacitor C1.

Figure 3D:
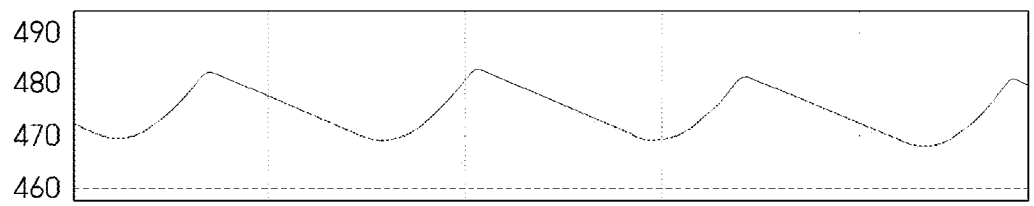

In FIG. 3D it can be seen that a target output voltage is 475 V and a ripple of the output voltage is maintained at about 12 V.

Figure 3E:
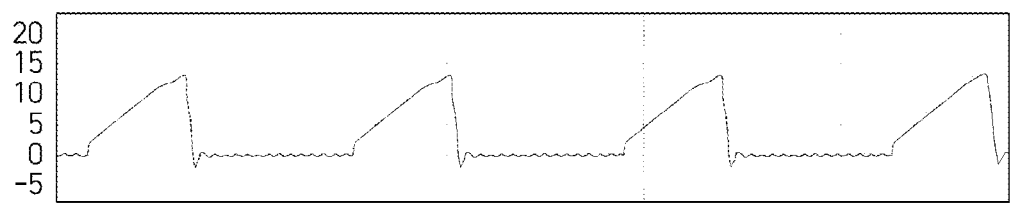

In FIG. 3E it can be seen that a target value of the output current is 5 A and a peak of a triangle wave of up to 13 A appears at a constant period.

Figure 4:
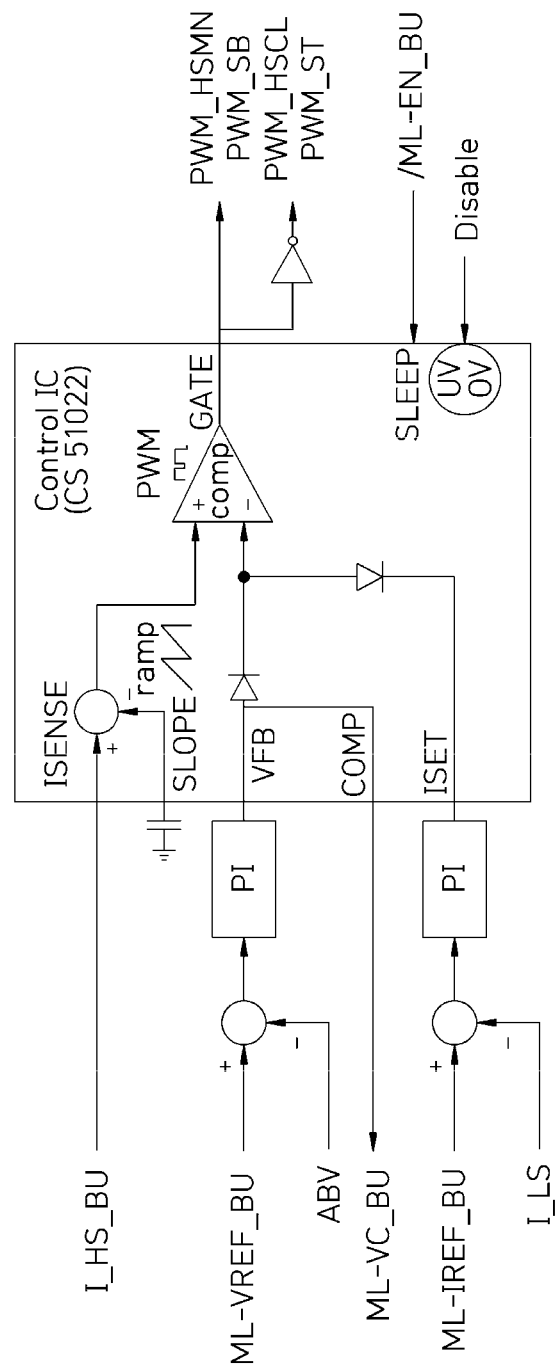
FIG. 4 is a diagram illustrating a controller of the step-down circuit (10)
Figure 5:
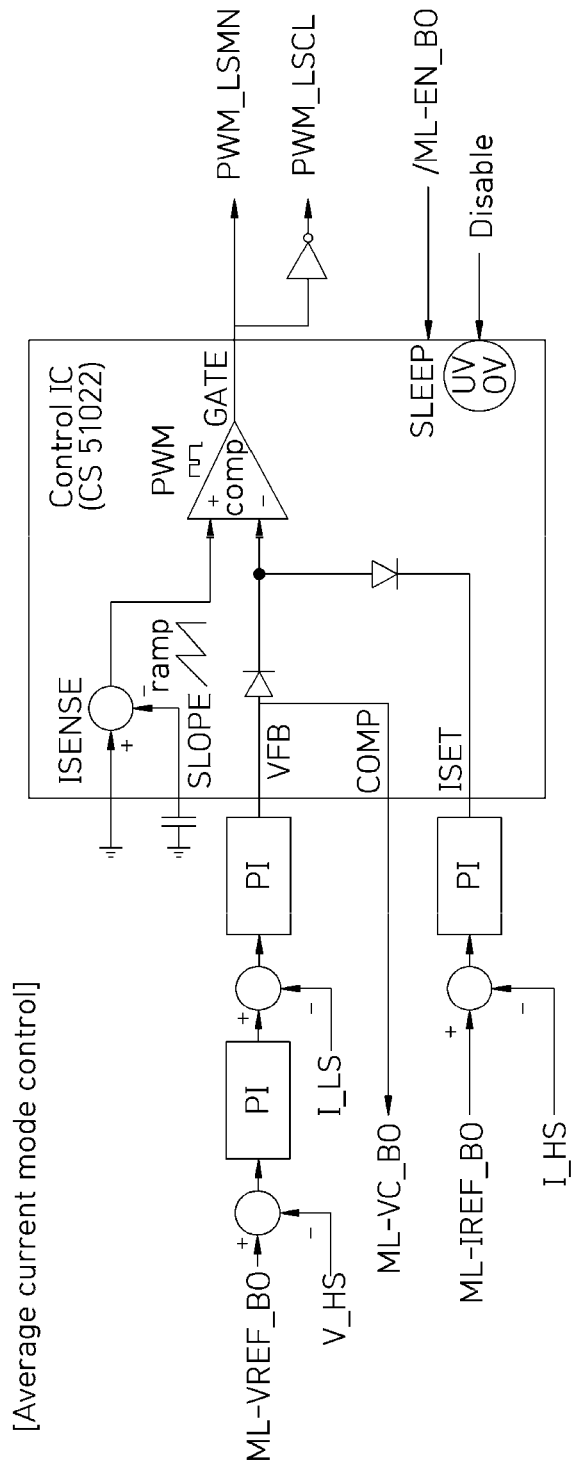
FIG. 5 is a diagram illustrating a controller of the step-up circuit (20)

FIG. 4 is a diagram illustrating a controller of the step-down circuit 10, and FIG. 5 is a diagram illustrating a controller of the step-up circuit 20. These controllers may be a part of a microcomputer formed based on a microcomputer (a micom) or may be separate circuit units separated from the microcomputer. Alternatively, these controllers may be formed in the form of being embedded in the same housing together with the LDC of FIG. 1.

To describe a configuration and an operation, in FIG. 4, a control signal from the microcomputer and a sensor signal from FIG. 1 are applied to an input terminal of a PWM control IC (e.g., CS51022), and a power semiconductor switching signal of the LDC circuit of FIG. 1 is output from an output stage of the PWM control IC. Similarly, in FIG. 5, a control signal from the microcomputer and a sensor signal from FIG. 1 are applied to an input terminal of a PWM control IC (e.g., CS51022), and a power semiconductor switching signal of the LDC circuit of FIG. 1 is output from an output terminal of the PWM control IC.

In FIG. 1, since both of the outputs of the two circuits 10 and 20 are output from the batteries (the HV and the LV), constant current (CC) and constant voltage (CV) control is necessary. Therefore, both of the voltage and the current of the output stage should be input to the controller as control targets. In addition, in order to increase responsiveness of the voltage control, information on a current of the input stage is additionally required. In particular, when stepping down, a control strategy is a peak current mode control method. By inputting a maximum value of a current (HV) of the input stage to the controller (see FIG. 4) at every switching period, saturation of the transformer TR1 may be prevented and, simultaneously, the semiconductor elements in the high voltage stage may be protected. On the other hand, when stepping up, a control strategy is an average current mode control method. By using information on which an input current I_LS is filtered in the controller (see FIG. 5), it is possible to reduce malfunction of the controller due to a switching noise generated when a large current is switched.

Here, the peak current mode control method and the average current mode control method are current mode control methods which are widely used as a current mode control method of the LDC. The peak current mode control method is a method of detecting an instantaneous value (a peak value) of a current applied to a component and blocking the current flowing in the component at an instant when the peak value of the detected current reaches a target current control value (a power switch element is turned OFF), thereby controlling a maximum current applied to the component. The average current mode control method is a method of detecting the instantaneous value of the current applied to the component or a filtered average value and controlling an average amount of the current applied to the component.

To this end, as shown in FIG. 1, the current transformer CT and the bidirectional Hall sensor type current sensor Cs' for measuring the current of the step-down circuit 10 are used in the high voltage stage, and a large current and bidirectional Hall sensor type current sensor Cs2 is used in the low voltage stage.

Specifically, in FIG. 4, a current I_HS_BU detected by the CT of the step-down circuit 10 of FIG. 1 is input to an ISENSE (Current sense amplifier input) terminal of the PWM control IC, CS51022. A reference voltage signal ML-VREF_BU from the microcomputer is added to a voltage ABV of the LV+ of FIG. 1 and is input to a VFB (Feedback voltage input) terminal of the PWM control IC through an integrator PI. Then, a reference current signal ML-IREF_BU from the microcomputer is added to a current value I_LS of the CS2 of FIG. 1 and is input to an ISET terminal (Threshold setting pin. According to a CS51022 data sheet, the voltage at ISET pin sets pulse-by-pulse overcurrent threshold, and second threshold with Soft Start retrigger.) of the PWM control IC through the integrator PI. The PWM control IC receiving the control signals and the sensed values performs a designed operation, generates a PWM_HSMN signal and a PWM_SB signal, which are PWM signals capable of appropriately controlling the semiconductor elements Q_HSMN and Q_SB of the step-down circuit 10 of the LDC of FIG. 1, to output the PWM_HSMN signal and the PWM_SB signal to a GATE (External power switch driver) terminal, and inverts the PWM_HSMN signal and the PWM_SB signal to output a PWM_HSCL signal and a PWM_ST signal which are PWM signals capable of appropriately controlling the semiconductor elements Q_HSCL and Q_ST.

In addition, in the controller of FIG. 5, a reference voltage signal ML-VREF_BO from the microcomputer is added to a voltage V_HS of the HV+ of FIG. 1 to pass through the integrator PI and is added to a current value I_LS of the CS2 again to pass through the integrator PI to be input to the VFB terminal of the PWM control IC. Then, a reference current signal ML-IREF_BO from the microcomputer is added to a current value I_HS of the CS1 of FIG. 1 and is input to the ISET terminal of the PWM control IC through the integrator PI. The PWM control IC receiving the control signals and the sensed values performs a designed operation, generates a PWM_LSMN signal, which is a PWM signal capable of appropriately controlling the semiconductor element Q_LSMN of the step-up circuit 20 of the LDC of FIG. 1, to output the PWM_LSMN signal to the GATE terminal, and inverts the PWM_LSMN to output a PWM_LSCL which is a PWM signal capable of appropriately controlling the semiconductor element Q_LSCL.

A ML-VC_BU signal, which was not described above and which is output from a COMP (Error amplifier output) terminal (According to a CS51022 data sheet, a frequency compensation network is usually connected between COMP and VFB pins) of the PWM control IC of the circuit of FIG. 4, is a signal which is input to the microcomputer and provides feedback on whether the step-down circuit 10 of the LDC of FIG. 1 is in normal operating state, and a/ML-EN_BU signal and a Disable signal, which are input to a SLEEP (Chip disable) terminal of the PWM control IC, are signals for activating a sleep mode of the PWM control IC according to a result of a protective function of performing hardware diagnosis on the step-down circuit 10 of the LDC of FIG. 1. Similarly, a ML-VC_BO signal output from the COMP terminal of the PWM control IC of the circuit of FIG. 5 is a signal which is input to the microcomputer and provides feedback on whether the step-up circuit 20 of the LDC of FIG. 1 is in normal operating state, and a/ML-EN_BO signal and a Disable signal, which are input to the SLEEP terminal of the PWM control IC, are signals for activating the sleep mode of the PWM control IC according to a result of the protective function of performing hardware diagnosis on the step-up circuit 20 of the LDC of FIG. 1.

The above-described protective function will be described with reference to Table 1 below. The protective function is necessary for protection of internal components of the DC-DC converter and for vehicle safety. Since protection against overvoltage and overcurrent in the high voltage stage and the low voltage stage is required, when a voltage and a current exceed reference levels, the protective function is performed.

TABLE 1

| Position | Protection item | Operation | Description |
| --- | --- | --- | --- |
| High voltage stage | Overvoltage | Step-up and step-down controllers are disabled | No PWM output for switch operation |
| | | PWM drive circuit for step-up is disabled | Operation of PWM signal transmission circuit is stopped |
| | Overcurrent | PWM drive circuit for step-up is disabled | Operation of PWM signal transmission circuit is stopped |
| Low voltage stage | Overvoltage | Back to Back semiconductor switch is turned off | Low voltage battery stage is cut-off |
| | | PWM drive circuit for step-down is disabled | Operation of PWM signal transmission circuit is stopped |
| | Overcurrent | Back to Back semiconductor switch is turned off | Low voltage battery stage is cut-off |

Figure 6A:
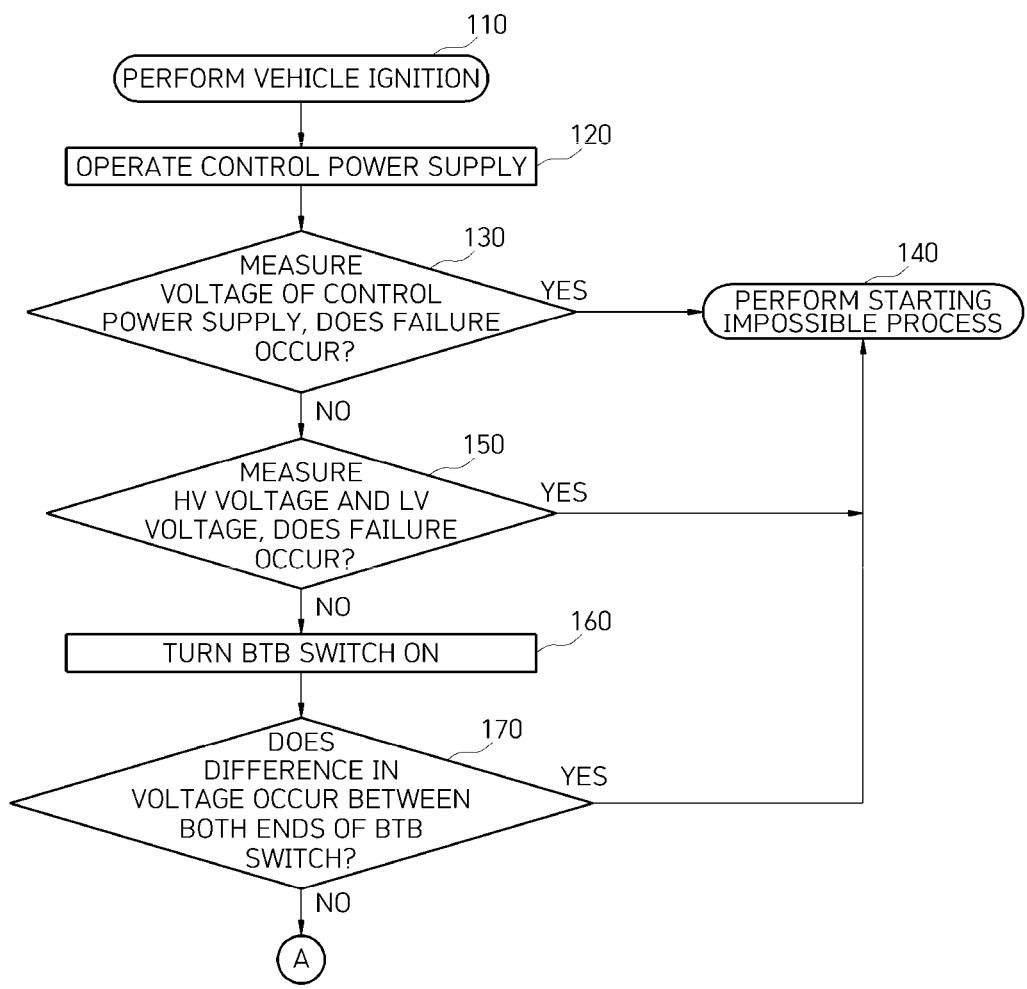
FIGS. 6A and 6B is a flowchart for describing an operating method of the bidirectional insulating LDC according to the present disclosure.
Figure 6B:
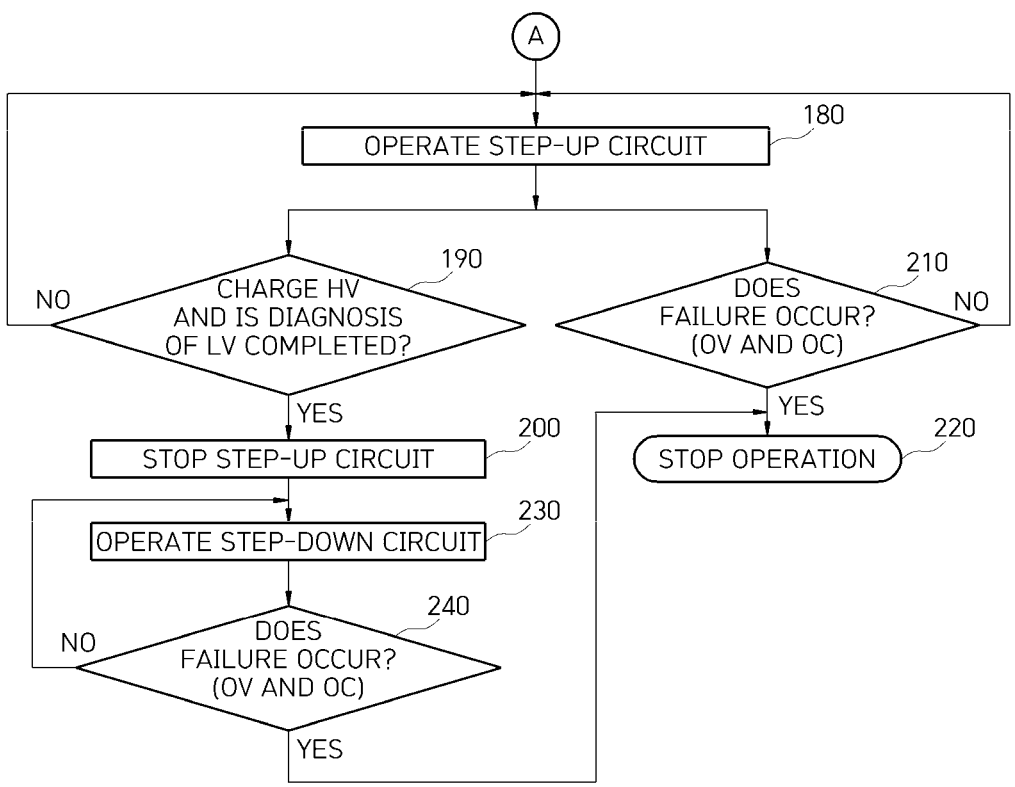

Referring to FIGS. 6A and 6B, an operating method of a bidirectional insulating DC-DC converter according to the present disclosure will be described.

When a driver performs a vehicle ignition operation (110), a control power supply (e.g., a switching mode power supply (SMPS)) for the bidirectional insulating DC-DC converter operates (120). In this case, an output voltage of the control power supply is measured to determine whether a failure occurs from the power supply (130). When the failure occurs, a starting impossible process is performed (140), and when the failure does not occur, a HV voltage and a LV voltage of the bidirectional insulating DC-DC converter are measured to determine whether the failure occurs from the DC-DC converter (150). When the failure occurs, the starting impossible process is performed (140), and when the failure does not occur, the BtB switch in the low voltage stage of the bidirectional insulating DC-DC converter is turned on (160). In order to determine whether the bidirectional insulating DC-DC converter fails, it is determined whether a difference in voltage occurs between both ends of the turned-on BtB (170). When the voltage difference occurs, the starting impossible process is also performed for safety (140), and when no voltage difference occurs, the step-up circuit 20 of the bidirectional insulating DC-DC converter of the present disclosure is operated (180)

to charge the high voltage battery HV (190). The charging of the high voltage battery HV proceeds until diagnosis of the low voltage battery LV is completed. That is, during the charging of the high voltage battery HV, the diagnosis of the low voltage battery LV is performed and whether the diagnosis is completed is determined (190), and when the diagnosis is completed, the operation of the step-up circuit 20 is stopped (200). Thereafter, the step-down circuit 10 is operated to charge the low voltage battery LV (230). The operation of the step-down circuit 10 continues until the vehicle ignition is turned off.

On the other hand, when the operation of the step-up circuit 20 is started in operation 180 but it is determined that the step-up circuit 20 fails (210), the operation of the bidirectional insulating DC-DC converter is stopped (220). Similarly, when the operation of the step-down circuit 10 is started in operation 230, but it is determined that the step-down circuit 10 fails (240), in this case, the operation of the bidirectional insulating DC-DC converter is also stopped (220). The determination of whether the failure occurs is no generation of the voltages and the currents in the high voltage stage and the low voltage stage (OV=overvoltage and OC=overcurrent).

In accordance with the present disclosure, since high voltage/low voltage terminals, a cooling passage, a housing, and a control circuit are used in common, a product mounting space (mainly an engine room) in a vehicle can be sufficiently secured and a weight of the vehicle can be reduced. In addition, the number of electric wires (high voltage lines, low voltage lines, and signal lines) connecting the vehicle to a low voltage DC-DC converter (LDC) can be reduced, and the number of control variables is reduced so that there are many advantages from a point of view of the vehicle.

In addition to two independent circuits (a step-down circuit and a step-up circuit) formed in parallel, a filter and a printed circuit board (PCB) are used in common in the high voltage stage and the low voltage stage so that costs and a space can be reduced.

Since one control board controls the two independent circuits, the ease of control is high, and since a signal can be used in common when a logic is formed, costs of components and a probability of malfunction can be reduced.

A forward converter is generally more efficient at a light load with a low output. This is consistent with a profile of a use amount of a main load in the vehicle and is suitable for reducing power conversion loss. In addition, in accordance with the present disclosure, since a rectifying diode in the forward converter is replaced with a metal oxide semiconductor field effect transistor (MOSFET), efficiency reduction can be decreased even in a situation in which an output current is large. Accordingly, high efficiency, which is an important factor in an eco-friendly vehicle, can be satisfied.

While the present disclosure has been described in detail with reference to the exemplary embodiments, those skilled in the art can understand that the present disclosure can be implemented in other specific forms different from the content described herein without departing from the technical spirit or the necessary features of the present disclosure. It should be understood that the above-described embodiments are not restrictive but illustrative in all aspects. In addition, the scope of the present disclosure is defined by the appended claims rather than the detailed description, and it should be construed that all alternations or modifications derived from the meaning and scope of the appended claims and the equivalents thereof fall within the technical scope of the present disclosure.

What is claimed is:

1. A bidirectional insulating DC-DC converter comprising:
   a first battery and a second battery, a discharge voltage of the first battery being relatively higher than that of the second battery;
   a step-down circuit configured to step down a voltage applied from the first battery and output the stepped-down voltage to the second battery; and
   a step-up circuit connected in parallel to the step-down circuit and configured to step up a voltage applied from the second battery and output the stepped-up voltage to the first battery,
   wherein the step-down circuit includes an active clamp forward converter circuit, and the step-up circuit includes an active clamp flyback converter circuit, and
   wherein the step-down circuit comprises:
      a current transformer configured to convert a current value into a voltage and detect the current value for current control of a first voltage stage which is an input part of the step-down circuit;
      a semiconductor switch element in the first voltage stage configured to alternately switch the voltage of the first battery so as to perform a function of the active clamp forward converter;
      a transformer configured to step down the voltage switched by the semiconductor switch element in the first voltage stage, transfer the stepped-down voltage to a second voltage stage, and electrically insulate the first voltage stage from the second voltage stage; and
      semiconductor switch elements in the second voltage stage configured to rectify a voltage output from the transformer.

2. The bidirectional insulating DC-DC converter of claim 1, further comprising:
   a first current sensor connected in common to the step-down circuit and the step-up circuit and configured to detect a current flowing between the first battery, the step-down circuit, and the step-up circuit;
   a second current sensor connected in common to the step-down circuit and the step-up circuit and configured to detect a current flowing between the second battery, the step-down circuit, and the step-up circuit; and
   a bidirectional back-to-back semiconductor switch element connected in common to the step-down circuit and the step-up circuit and configured to separate the second battery from the step-down circuit and the step-up circuit.

3. The bidirectional insulating DC-DC converter of claim 1, wherein the transformer comprises a primary winding connected to the semiconductor switch element in the first voltage stage, a secondary winding connected to one of the semiconductor switch elements in the second voltage stage, and a tertiary winding connected to the other one of the semiconductor switch elements in the second voltage stage.

4. The bidirectional insulating DC-DC converter of claim 1, wherein the step-up circuit comprises:
   a semiconductor switch element in a second voltage stage configured to alternately switch a voltage of the second battery so as to perform a function of the active clamp forward converter;
   a transformer configured to step up the voltage switched by the semiconductor switch element in the second voltage stage, transfer the stepped-up voltage to a first voltage stage, and electrically insulate the second voltage stage from the first voltage stage; and a rectifying element configured to rectify a voltage output from the transformer and transfer the rectified voltage to the first battery.

5. The bidirectional insulating DC-DC converter of claim 4, wherein the transformer comprises a primary winding connected to the semiconductor switch element in the second voltage stage and a secondary winding connected to the rectifying element.

6. A control apparatus for a bidirectional insulating DC-DC converter comprising:
a step-down circuit including an active clamp forward converter circuit and configured to step down a voltage applied from a first battery and output the stepped-down voltage to a second battery, a discharge voltage of the first battery being relatively higher than that of the second battery, and a step-up circuit including an active clamp flyback converter circuit, connected in parallel to the step-down circuit and configured to step up a voltage applied from the second battery and output the stepped-up voltage to the first battery, the control apparatus comprising:
a step-down circuit controller configured to control the step-down circuit in a peak current mode control method; and
a step-up circuit controller configured to control the step-up circuit in an average current mode control method,
wherein the step-down circuit controller comprises a pulse width modulation (PWM) control integrated circuit (IC) configured to output a PWM signal for PWM switching control of a semiconductor switch element of the step-down circuit, and a microcomputer configured to provide a control signal to the PWM control IC, and
the step-up circuit controller comprises a PWM control IC configured to output a PWM signal for PWM switching control of a semiconductor switch element of the step-down circuit, and a microcomputer configured to provide a control signal to the PWM control IC.

7. The control apparatus of claim 6, wherein the step-down circuit controller: converts a current value of a first voltage stage of the step-down circuit into a voltage to input a current (IHSBU) detected in a current transformer to be detected to a current sense amplifier input terminal of the PWM control IC; adds a reference voltage signal (ML-VREF_BU) from the microcomputer to a voltage of the second battery of the bidirectional insulating DC-DC converter to generate an added voltage, and inputs the added voltage to a feedback voltage input terminal of the PWM control IC; and adds a reference current signal (ML-IREFBU) from the microcomputer to a current value (ILS) detected in a current sensor in a second voltage stage of the bidirectional insulating DC-DC converter to input the added current to a threshold setting terminal of the PWM control IC so that the PWM control IC generates the PWM signal for controlling the semiconductor element of the step-down circuit.

8. The control apparatus of claim 6, wherein the step-up circuit controller:
adds a reference voltage signal (ML-VREF_BO) from the microcomputer to a voltage (V_HS) of the first battery of the bidirectional insulating DC-DC converter and adds a current value (I_LS) detected by a current sensor in a second voltage stage of the bidirectional insulating DC-DC converter again to input the added signal to a feedback voltage input terminal of the PWM control IC; and
adds a reference current signal (ML-IREF_BO) from the microcomputer to a current value (I_HS) detected by a current sensor in a first voltage stage of the bidirectional insulating DC-DC converter to input the added signal to a threshold setting terminal of the PWM control IC so that the PWM control IC generates the PWM signal for controlling the semiconductor element of the step-up circuit.

9. The control apparatus of claim 6, wherein the step-down circuit controller is configured to input a signal (ML-VC_BU) output from an error amplifier output terminal of the PWM control IC to the microcomputer to provide feedback on whether the step-down circuit of the bidirectional insulating DC-DC converter is in normal operating state.

10. The control apparatus of claim 6, wherein the step-up circuit controller is configured to input a signal (ML-VC_BO) output from an error amplifier output terminal of the PWM control IC to the microcomputer to provide feedback on whether the step-up circuit of the bidirectional insulating DC-DC converter is in normal operating state.

11. An operating method of a bidirectional insulating DC-DC converter comprising a step-down circuit configured to step down a voltage applied from a first battery and output the stepped-down voltage to a second battery, a discharge voltage of the first battery being relatively higher than that of the second battery, a step-up circuit configured to step up a voltage applied from the second battery and output the stepped-up voltage to the first battery, and a bidirectional back-to-back semiconductor switch element configured to separate a second voltage stage, the operating method comprising:
(1) when a starting operation of a vehicle is performed, determining whether a failure of the bidirectional insulating DC-DC converter occurs;
(2) when the failure occurs, performing a starting impossible process, and if the failure does not occur, turning the bidirectional back-to-back semiconductor switch element in the second voltage stage of the bidirectional insulating DC-DC converter on and determining whether a difference in voltage between both ends of the bidirectional back-to-back semiconductor switch element occurs;
(3) when the voltage difference occurs, performing the starting impossible process for safety, and when the voltage difference does not occur, operating the step-up circuit of the bidirectional insulating DC-DC converter and charging the first battery;
(4) during the charging of the first battery, performing a diagnosis on the second battery, and when the diagnosis is completed, stopping the operation of the step-up circuit; and
(5) operating the step-down circuit and performing charging of the second battery.

12. The operating method of claim 11, further comprising, in operation (1), before the determining whether the failure of the bidirectional insulating DC-DC converter occurs,
when the starting operation of the vehicle is executed, measuring an output voltage of a control power supply for the bidirectional insulating DC-DC converter to determine whether the failure occurs, and when the failure occurs, performing the starting impossible process, and when the failure does not occur, performing operation (1).

13. The operating method of claim 11, further comprising, in operation (3), after the operation of the step-up circuit is started, when the step-up circuit is determined to have failed, stopping the operation of the bidirectional insulating DC-DC converter.

14. The operating method of claim 11, further comprising, in operation (5), after the operation of the step-down circuit is started, when the step-down circuit is determined to have failed, stopping the operation of the bidirectional insulating DC-DC converter.

15. A bidirectional insulating DC-DC converter comprising:
- a first battery and a second battery, a discharge voltage of the first battery being relatively higher than that of the second battery;
- a step-down circuit configured to step down a voltage applied from the first battery and output the stepped-down voltage to the second battery; and
- a step-up circuit connected in parallel to the step-down circuit and configured to step up a voltage applied from the second battery and output the stepped-up voltage to the first battery, wherein the step-down circuit includes an active clamp forward converter circuit, and the step-up circuit includes an active clamp flyback converter circuit, and wherein the step-up circuit comprises:
- a semiconductor switch element in a second voltage stage configured to alternately switch a voltage of the second battery so as to perform a function of the active clamp forward converter;
- a transformer configured to step up the voltage switched by the semiconductor switch element in the second voltage stage, transfer the stepped-up voltage to a first voltage stage, and electrically insulate the second voltage stage from the first voltage stage; and
- a rectifying element configured to rectify a voltage output from the transformer and transfer the rectified voltage to the first battery.

\* \* \* \* \*